United States Patent [19]
Pientka et al.

[11] Patent Number: 5,789,889
[45] Date of Patent: Aug. 4, 1998

[54] ARRANGEMENT FOR OPERATING A WINDSHIELD WIPER

[75] Inventors: Rainer Pientka, Achern; Henry Blitzke, Buehl; Joerg Buerkle, Offenburg, all of Germany

[73] Assignee: Robert Bosch GmbH, Stuttgart, Germany

[21] Appl. No.: 765,809

[22] PCT Filed: Apr. 17, 1996

[86] PCT No.: PCT/DE96/00669

§ 371 Date: Jan. 16, 1997

§ 102(e) Date: Jan. 16, 1997

[87] PCT Pub. No.: WO96/37389

PCT Pub. Date: Nov. 28, 1996

[30] Foreign Application Priority Data

May 27, 1995 [DE] Germany ............... 195 19 566.3

[51] Int. Cl.[6] ............... B60S 1/08; H02P 1/04
[52] U.S. Cl. ............... 318/483; 318/443; 318/483; 318/DIG. 2; 15/250 C
[58] Field of Search ............... 318/DIG. 2, 440–469, 318/483, 283; 15/250.13; 340/602, 601, 438, 439

[56] References Cited

U.S. PATENT DOCUMENTS

| | | | |
|---|---|---|---|
| 4,495,452 | 1/1985 | Boegh-Peterson | 318/444 |
| 4,916,374 | 4/1990 | Schierbeek et al. | 318/483 |
| 5,117,168 | 5/1992 | Nomura et al. | 318/444 |
| 5,216,341 | 6/1993 | Nomura et al. | 318/444 |
| 5,306,992 | 4/1994 | Droge | 318/483 |
| 5,508,595 | 4/1996 | Schaefer | 318/444 |
| 5,568,027 | 10/1996 | Teder | 318/483 |
| 5,581,240 | 12/1996 | Egger | 340/602 |

FOREIGN PATENT DOCUMENTS

| | | |
|---|---|---|
| 438633 | 7/1991 | European Pat. Off. . |
| 4334381 | 4/1995 | Germany . |
| 2068249 | 7/1990 | Japan . |
| 89-00119 | 1/1989 | WIPO . |
| 90-08680 | 8/1990 | WIPO . |

Primary Examiner—Paul Ip
Attorney, Agent, or Firm—Spencer & Frank

[57] ABSTRACT

The invention relates to an arrangement for the automatic operation of a windshield wiper, having a sensor device for detecting the degree of moisture on a windshield, an evaluation device, and an actuation unit for the windshield wiper which is actuated by the evaluation device. The degree of moisture on the windshield can be analyzed better in that the evaluation device in has a recognition stage for recognizing drying moisture that is present on the windshield. By means of this recognition stage, whether the level of the measured values is rising as a result of the drying process can be determined from a time sequence of measured values derived from the sensor signal. In this manner, unnecessary wiping actions can be prevented.

6 Claims, 1 Drawing Sheet

ARRANGEMENT FOR OPERATING A WINDSHIELD WIPER

BACKGROUND OF THE INVENTION

The invention relates to an arrangement for operating a windshield wiper, having a sensor device for detecting the degree of moisture on a windshield with an evaluation device receiving the sensor signal, which evaluation device is provided with a signal processing device, a triggering stage for the wiping operation and a control signal generating device, and having an actuation unit for the windshield wiper which can be actuated by the evaluation device to produce a wiping action.

An arrangement of this type has been revealed as being known in EP 360 832 B1. Here, a suitable wiping operation is triggered automatically if certain triggering criteria are recognized in the sensor signal. Fast-drying water streaks on the windshield stemming, for example, from damaged wiper blades and for which a wiping operation is inappropriate are not recognized reliably, if at all, which may result in undesired wiping actions.

SUMMARY OF THE INVENTION

It is the object of the invention to modify an arrangement of the type mentioned at the outset in such a way that unnecessary wiping actions are reliably prevented.

This object is solved an arrangement of the generic type by the features listed in patent claim 1.

In order to attain this object, the evaluation device is provided with a recognition stage for drying moisture that is present on the windshield; by means of the recognition stage a level of the measured values that is rising as a result of the drying process can be determined from a time sequence of measured values derived from the sensor signal.

By way of these measures, a phase of drying moisture on the windshield, as it occurs, for example, when streaks are formed due to worn-out windshield wipers, is recognized reliably so that during this phase a wiping action can be suppressed by the evaluation device. Unnecessary dry wiping is therewith prevented since such moisture residues usually quickly dry by themselves.

A simple, reliably functioning embodiment of the arrangement is comprised in that the recognition stage has a difference generator for detecting the difference between the actual measured value and a preceding measured value as well as an adding stage for generating the sums of the successive, signed differences and in that the drying moisture can be recognized by determining whether the sum exceeds a preset threshold.

Here, a simple design is such that the summing stage is formed by way of a summation register having an upper and a lower limit value which are not exceeded or undershot in the addition, such that the threshold lies within the limit values, and such that the sum is set to be in the proximity of the threshold as starting value when the arrangement is started.

If the threshold has a hysteresis, interferences which can cause fluctuations around the threshold range are suppressed reliably.

If it is provided that the triggering stage has a differential trigger which can be switched so as to be inactive when a phase of drying moisture is recognized, a wiping operation during such a phase is reliably prevented, even though the triggering threshold is exceeded during the differential operation, that is, when the difference of the signal level compared to a predetermined reference value exceeds a preset magnitude.

BRIEF DESCRIPTION OF THE DRAWINGS

The invention is described below in greater detail by way of an embodiment with reference to the drawings. These show.

DESCRIPTION OF THE PREFERRED EMBODIMENT

Figure 1:
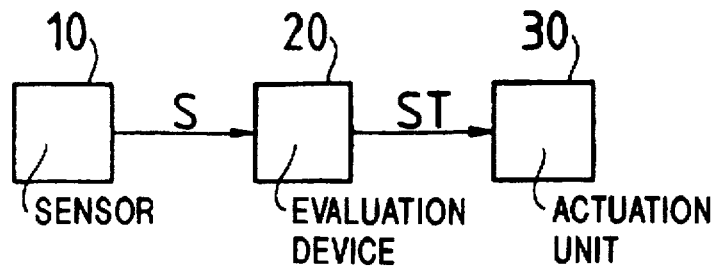
FIG. 1 is a schematic block illustration of an arrangement for the automatic operation of a windshield wiper.

FIG. 1 shows an arrangement for the automatic operation of a windshield wiper having a sensor device 10 which emits a sensor signal S to an evaluation device 20. The sensor signal S may already be processed and can be processed further in the evaluation device so as to supply a control signal ST to an actuation unit 30 via which a windshield wiper, not shown, is operated.

The level of the sensor signal S changes according to the degree of moisture on the windshield so that, from this, by means of the evaluation unit 20, a suitable wiping operation can be derived which is adapted to the exterior conditions. For example, during rain or snow, the level of the sensor signal 20 is reduced compared to a reference level to an extent that a shortfall with respect to a triggering threshold occurs (or a difference with respect to the reference level is exceeded), resulting in a triggering of the wiping operation.

During the course of the wiping operation it may be that, for example, due to poor wiper blades moisture residues are distributed over the windshield which lower the level SP of the sensor signal S to below the triggering threshold. But such moisture residues, for example, streaks, dry relatively quickly so that a wiping operation is unsuitable in this phase and an unnecessary dry wiping action may be initiated. Such a phase of drying moisture is recognized reliably by means of the measures described in the following.

Figure 2:
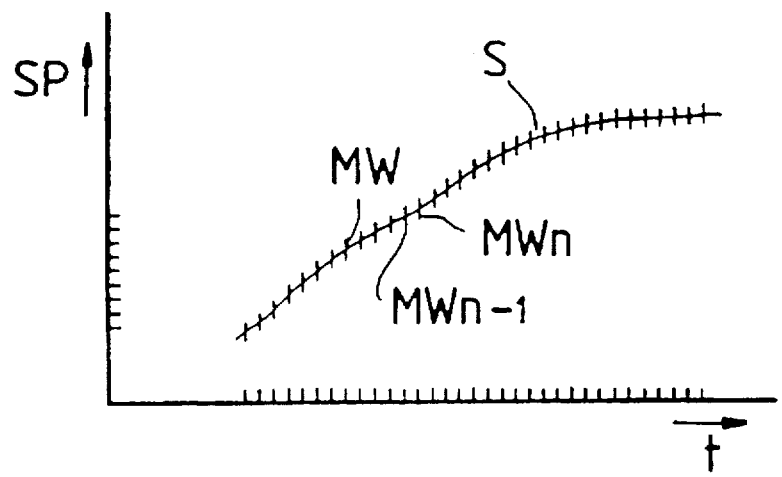
FIG. 2 is a graph showing the course of a sensor signal plotted over time during a drying phase.
Figure 3:
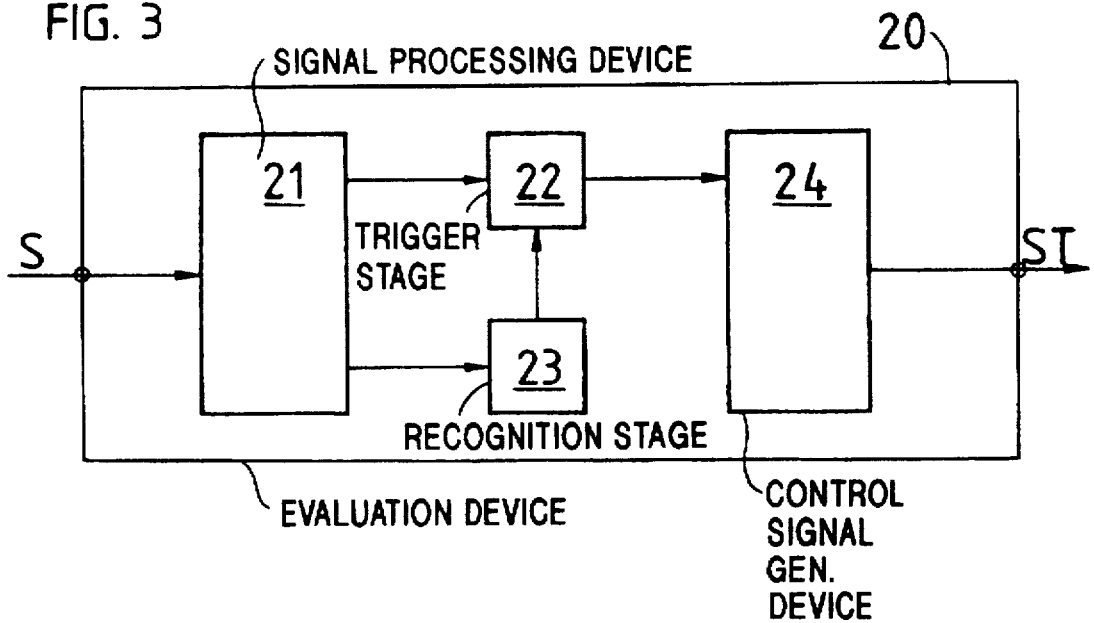
FIG. 3 is a schematic block illustration showing the composition of an evaluation device of shown in FIG. 1.

FIG. 2, for example, illustrates a segment of a sensor signal S during a drying process plotted over time. Due to the drying process the signal level SP rises consistently and rather quickly. Twenty measured values MW, $MW_{n-1}$ are derived from the signal by means of the evaluation device; for this purpose the evaluation device 20 is provided with a signal processing device 21. The measured values MW are supplied to a triggering stage 22 comprising, for example, a differential triggering stage which, in turn, transmits data to a control signal generating device 24 for the generation of the control signal ST. The measured values MW are further supplied to a recognition stage 23 by means of which a phase of drying moisture can be detected. For this purpose, the recognition stage 23 is provided with a difference generator for detecting the difference between the actual measured value $MW_n$ and a preceding measured value $MW_{n-1}$ as well as with an adding stage for generating the sums of the successive, signed differences. The drying moisture is recognized in that a comparator determines whether the sum exceeds a predetermined threshold.

The summing stage is formed by way of a summation register having an upper and a lower threshold value which are not exceeded or undershot in the addition. The threshold lies between the two limit values and is provided with a hysteresis for suppressing interferences which might cause faulty data.

The measured values are picked up, for example, every 5 ms, and the corresponding differences and sums are generated directly so that it is recognized within a very short time, for example, 20 ms, whether a phase of drying moisture is occurring and a triggering of the wiping operation should be suppressed. If such a drying phase is recognized, the differential trigger is switched to be inactive in order to reliably suppress a wiping operation resulting from a differential triggering.

At the time of startup of the arrangement, a sum is predetermined which is preferably in the proximity of the threshold. If a wetting event occurs, the sensor signal is first reduced so that a wiping operation is triggered by the differential trigger if the triggering threshold is not reached. After the wetting event has ended, streaks caused by poor wiper blades may still bring about a degree of moisture which reduces the signal level SP to below the triggering threshold. As a result of the drying process, the signal level now increases relatively continuously so that, by way of adding the differences of the measured values MW, the threshold for recognizing the drying phase is exceeded within a relatively short time, and in this phase a wiping operation is blocked as a result of the differential triggering.

Therewith, the measures according to the invention allow the suppression of unnecessary wiping actions.

What is claimed is:

1. An improved arrangement for operating a windshield wiper, the arrangement having sensor means (10) for detecting the degree of moisture on a windshield and generating a sensor signal (S) in response thereto, evaluation means (20) for evaluating the sensor signal (S) to generate a control signal (ST), and actuation means (30) for selectively actuating the windshield wiper in response to the control signal (ST) to produce wiping actions, wherein the improvement comprises:

the evaluation means (20) includes recognition means (23) for recognizing the presence of drying moisture on the windshield from a rising level of the measured values (MW) in a time sequence of measured values (MW) derived from the sensor signal (S), wiping being suppressed by the evaluation means (20) if drying moisture is detected.

2. An arrangement according to claim 1, wherein the recognition means (23) comprises difference generator means for finding the difference between a current measured value ($MW_n$) and a preceding measured value ($MW_{n-1}$), and adding means for generating the sums of the successive, signed differences found by the difference generator means, wherein the presence of drying moisture is recognized by determining whether the sum exceeds a preset threshold.

3. An arrangement according to claim 2, wherein the adding means comprises a summation register having an upper and a lower limit value which are not exceeded or undershot in the addition, and wherein the threshold lies within the limit values and the sum is set to be in the proximity of the threshold as starting value when the arrangement is started.

4. An arrangement according to claim 3, wherein the threshold has a hysteresis.

5. An arrangement according claim 1, wherein the evaluation means (20) further comprises triggering means (22) for selectively triggering wiping operations in response to the measured values (MW), the trigger means including a differential trigger which is switched so as to be inactive when a phase of drying moisture is recognized by the recognition means (22).

6. An arrangement according to claim 1, wherein the evaluation means (20) comprises signal processing means (21) for deriving the time sequence of measured values (MW) from the sensor signal (S), trigger means (22) for selectively triggering wiping operations in response to the measured values (MW), and control signal generating means (24) for generating the control signal in response to the trigger means (22).

* * * * *